(12) United States Patent
Wakabayashi et al.

(10) Patent No.: US 7,028,002 B2
(45) Date of Patent: Apr. 11, 2006

(54) CAR SALE INFORMATION PROVIDING SYSTEM AND METHOD, AND CAR DEALING SYSTEM

(75) Inventors: Akira Wakabayashi, Tokyo (JP); Masashi Onoue, Tokyo (JP)

(73) Assignee: Tsubasa System Co., Ltd., Tokyo (JP)

( * ) Notice: Subject to any disclaimer, the term of this patent is extended or adjusted under 35 U.S.C. 154(b) by 781 days.

(21) Appl. No.: 09/867,158

(22) Filed: May 29, 2001

(65) Prior Publication Data

US 2001/0054017 A1    Dec. 20, 2001

(30) Foreign Application Priority Data

Jun. 15, 2000 (JP) .............................. 2000-180275
Aug. 9, 2000 (JP) .............................. 2000-241157

(51) Int. Cl.
*G06F 17/60* (2006.01)

(52) U.S. Cl. .............................. 705/26; 705/27; 701/29; 706/50

(58) Field of Classification Search .................... 705/4, 705/26, 27, 35, 13, 14, 400; 235/380; 345/473; 340/901; 701/29, 207; 706/50
See application file for complete search history.

(56) References Cited

U.S. PATENT DOCUMENTS

| | | | |
|---|---|---|---|
| 5,151,988 A | | 9/1992 | Yamagishi |
| 5,459,304 A | * | 10/1995 | Eisenmann ................. 235/380 |
| 5,844,987 A | * | 12/1998 | Matthews et al. .......... 340/901 |
| 6,026,398 A | | 2/2000 | Brown et al. |
| 6,041,310 A | * | 3/2000 | Green et al. .................. 705/27 |
| 6,433,784 B1 | * | 8/2002 | Merrick et al. ............. 345/473 |
| 6,587,838 B1 | * | 7/2003 | Esposito et al. ............. 705/26 |

(Continued)

FOREIGN PATENT DOCUMENTS

DE    197 43 878 A1    4/1999

(Continued)

OTHER PUBLICATIONS

Press release, Research pays off in auto purchase Internet, classifieds reliable resources; Bangor Daily news; Bangor, Me; Mar. 22, 1999; p. 1, extracted on Internet from Proquest database on Sep. 10, 2004.*

(Continued)

*Primary Examiner*—Yogesh C. Garg
*Assistant Examiner*—Patricia Lewis
(74) *Attorney, Agent, or Firm*—Burr & Brown

(57) ABSTRACT

An information processing technology of the present invention is capable of speeding up a process that a prospective buyer of a used car determines an intention of purchasing the car. A car sale information providing system of the present invention includes a car information storage unit (13, 14) stored with mappings of car information containing a name, a type, a year model etc of a car to car inspection information obtained as a result of inspecting the car concerned. A car information input device (27, 28) is provided for inputting the car information and getting the car information stored in the car information storage unit (13, 14). A search unit (12) is provided for outputting an input screen for searching the car information stored in the car information storage unit (13, 14), and searching based on conditions inputted. The system includes a car information output unit (26), for outputting display information, including a purchase indication interface for transmitting car purchase information containing the searched car information and the car inspection information corresponding to the car information.

5 Claims, 21 Drawing Sheets

U.S. PATENT DOCUMENTS

2002/0032626 A1* 3/2002 DeWolf et al. ............... 705/35
2002/0169640 A1* 11/2002 Freeland ........................ 705/4
2003/0105728 A1* 6/2003 Yano et al. .................. 705/400

FOREIGN PATENT DOCUMENTS

| EP | 0 549 140 A2 | 6/1993 |
| EP | 1 065 612 A2 | 1/2001 |
| EP | 1286287 A1 * | 2/2003 |
| JP | 10-049592 | 2/1998 |
| JP | 11-353388 | 12/1999 |
| WO | WO 99/14688 | 3/1999 |
| WO | WO 00/42558 | 7/2000 |
| WO | WO 01/11500 A1 | 2/2001 |

OTHER PUBLICATIONS www.bmw.de, 'Online!1999, XP002261623, Germany, Retrieved from the internet: <URL:http://web.archive.org/web/19990429005244/wwww.bmw.de/automark/index.htm>, 'retrieved on Nov. 13, 2003!.

* cited by examiner

FIG. 5

| | | | |
|---|---|---|---|
| REGISTERED WITH CAR MANAGEMENT NUMBER "5001234". PRINT AND STORE DATA ON SCREEN | | | PRINT |

| | | | |
|---|---|---|---|
| SALES DEALER NUMBER | 003497 | AUTOMOBILE SHOP ○○○○ | |
| MAKER | ○○○ | FRAME NUMBER | 00123456 |
| TYPE | E-JZZ31 | DISPLACEMENT | 3000cc |
| NAME OF CAR | ○○○ | SAFETY CHECK EXPIRATION DATE | AUGUST, 2000 |
| GRADE | GT | MILEAGE | 30,000km |
| SHAPE | 2CP | | |
| APPLICATION | FOR PRIVATE USE | SALES POINT | |
| | | SUPREME CAR | |
| EXTERIOR COATING COLOR | BLUE | | |
| COLOR NO. | 8J5 | | |
| INTERIOR COATING COLOR | GRAY | | |
| | | PHOTO | |
| FUEL | GASOLINE | | |
| GEAR SHIFT | FA | | |
| COOLING SYSTEM | AAC | | |
| EQUIPMENT | PS PW AW DP | | |
| | | INSPECTION CERTIFICATE | |
| POSSIBLE-DELIVERY DATE | IMMEDIATE TIME | | |
| SALES PRICE (UNIT: TEN THOUSANDS) | 135 | | |

FIG. 7

| | | |
|---|---|---|
| SALES MEMBER NUMBER | 003497 | AUTOMOBILE SHOP○○○○ |
| MAKER | ○○○ | |
| TYPE | E-JZZ31 | SALES POINT |
| NAME OF CAR | ○○○ | SUPREME CAR |
| GRADE | GT | |
| SHAPE | 2CP | |
| APPLICATION | FOR PRIVATE USE | |
| EXTERIOR COATING COLOR | BLUE | |
| COLOR NO. | 8J5 | |
| INTERIOR COATING COLOR | GRAY | |
| FRAME NUMBER | 00123456 | |
| DISPLACEMENT | 3000cc | INSPECTION CERTIFICATE |
| SAFETY CHECK EXPIRATION DATE | AUGUST, 2000 | |
| MILEAGE | 30,000km | |
| FUEL | GASOLINE | |
| GEAR SHIFT | FA | |
| COOLING SYSTEM | AAC | |
| EQUIPMENT | PS PW AW DP | |
| POSSIBLE-DELIVERY DATE | IMMEDIATE TIME | |
| SALES PRICE(UNIT :TEN THOUSANDS) | 140 | 44 PURCHASE |

*FIG. 17*

52 USED-CAR INFORMATION DATABASE

| CAR MANAGEMENT NUMBER | MAKER | TYPE | NAME OF CAR | YEAR MODEL | PRICE | |
|---|---|---|---|---|---|---|
| 100001 | TY | E-JZZ31 | OOO | H09-10 | 180 | ---- |
| 100002 | HN | DDDD | CR | H08-06 | 80 | ---- |
| ---- | ---- | ---- | ---- | ---- | ---- | ---- |

FIG. 18

53 EXHIBIT INFORMATION DATABASE

| CAR MANAGEMENT NUMBER | EXHIBIT DATA NUMBER | EXPLANATIONS | DATA FORMAT | POINTER TO EXHIBIT INFORMATION |
|---|---|---|---|---|
| 100001 | 1 | EXTERNAL CONFIGURATION | MPEG | TO (MPEG FORMATTED IMAGE DATA) |
| 100001 | 2 | DOOR OPENING/CLOSING CONDITIONS | MPEG | TO (MPEG FORMATTED IMAGE DATA) |
| 100001 | 3 | SOUND OF ENGINE | MP3 | TO (MP3 FORMATTED SOUND DATA) |
| 100001 | 4 | COATING SURFACE | MPEG | TO (MPEG FORMATTED IMAGE DATA) |
| 100001 | 5 | TRAVELING CONDITION | MPEG | TO (MPEG FORMATTED IMAGE DATA) |
| 100001 | 6 | ENGINE ROOM | MPEG | TO (MPEG FORMATTED IMAGE DATA) |
| 100002 | 1 | EXTERNAL CONFIGURATION | MPEG | TO (MPEG FORMATTED IMAGE DATA) |
| 100002 | 2 | DOOR OPENING/CLOSING CONDITIONS | MPEG | TO (MPEG FORMATTED IMAGE DATA) |
| 100003 | 3 | SOUND OF ENGINE | MP3 | TO (MP3 FORMATTED SOUND DATA) |
| 100004 | 4 | COATING SURFACE | MPEG | TO (MPEG FORMATTED IMAGE DATA) |
| 100005 | 5 | TRAVELING CONDITION | MPEG | TO (MPEG FORMATTED IMAGE DATA) |
| 100006 | 6 | ENGINE ROOM | MPEG | TO (MPEG FORMATTED IMAGE DATA) |
| ... | ... | ... | ... | ... |

FIG. 19

| CAR MANAGEMENT NUMBER | MAKER | NAME OF CAR | YEAR MODEL | PRICE |
|---|---|---|---|---|
| 100001 | TY | OOO | H09 | 180 |
| 100002 | HN | CR | H08 | 80 |

*FIG. 20*

| | |
|---|---|
| CAR MANAGMENT NUMBER | 100001 |
| MAKER | ○○○ |
| TYPE | E-JZZ31 |
| NAME OF CAR | ○○○ |
| GRADE | GT |
| SHAPE | 2CP |
| APPLICATION | FOR PRIVATE USE |
| EXTERIOR COATING COLOR | BLUE |
| COLOR NO. | 8J5 |
| INTERIOR COATING COLOR | GRAY |
| FRAME NUMBER | 00123456 |
| DISPLACEMENT | 3000cc |
| SAFETY CHECK EXPIRATION DATE | AUGUST, 2000 |
| MILEAGE | 30,000km |
| FUEL | GASOLINE |
| GEAR SHIFT | FA |
| COOLING SYSTEM | AAC |
| EQUIPMENT | PS PW AW DP |
| POSSIBLE-DELIVERY DATE | IMMEDIATE TIME |
| SALES PRICE (UNIT: TEN THOUSANDS) | 180 |

SALES POINT: SUPREME CAR

54 →MORE DETAILS

INSPECTION CERTIFICATE

44 PURCHASE

CAR SALE INFORMATION PROVIDING SYSTEM AND METHOD, AND CAR DEALING SYSTEM

BACKGROUND OF THE INVENTION

The present invention relates generally to an online used-car dealing technology, and more particularly to an online system effective in an inter-dealer transaction.

A used-car dealer, when receiving an inquiry about a used car from a general customer and if a dealer's stock does not have the car meeting requirements of the customer, searches the car desired by the customer with reference to a used-car database structured through a network in linkage with the used-car dealers.

This type of used-car dealing on the network involves a difficulty for a prospective buyer (dealer) to grasp an actual quality of the used car. Therefore, the prospective buyer is unable to determine the purchase only from a photo obtained from the database and assessment information given by a sales member.

Further, in the case of outputting information for specifying a car by use of character information and static image data, an actual condition of the car is hard to grasp. Especially, an expression of how a real coating surface is in the form of a static image with a fidelity requires a high-level photographing technology such as enhancing an image resolution. It is in fact difficult in terms of a communication load and a photographing cost to use the image described above. Therefore, a used-car dealing system on the network is operated, wherein an image obtained by photographing the whole of the used car from a forward oblique angle. What can be grasped from this kind of image is just that a name of car, a name of model and a color expressed by character information are correct or that the car has no damage by collision.

Accordingly, the prospective buyer searches the used cars from the database and, after finding out the desired car, asks an inspector to check the car by telephone or FAX etc. Then, a procedure taken is that a sales price other dealing conditions are finally determined based on a result of the inspection, and a negotiation with the general customer is started.

Therefore, it takes at least 2~3 days until the purchase is determined since the desired car was searched and found out.

SUMMARY OF THE INVENTION

It is a primary object of the present invention, which was devised to obviate the problems inherent in the prior art, to provide an information processing technology capable of speeding up a process that a prospective buyer of a used car determines an intention of purchasing it.

To accomplish the above object, according to one aspect of the present invention, a car sale information providing system comprises a car information storage unit (13, 14) stored with mappings of car information containing at least a name, a type, a year model of a car to car inspection information obtained as a result of inspecting the car concerned, a car information input device (27, 28) for inputting the car information and getting the car information stored in the car information storage unit (13, 14), a search unit (12) for outputting an input screen to input condition when searching the car information stored in the car information storage unit (13, 14), and searching based on conditions inputted, and a car information output unit (26), for outputting display information, including a purchase indication interface (44) for transmitting car purchase information containing the searched car information and the car inspection information corresponding to the car information.

The car sale information providing system may further comprise an inspection indication output unit (2b, 26) for outputting inspection indicative information for prompting an inspection of an uninspected car, corresponding to the input of the car information input device (27, 28), wherein the car information input device (27, 28) gets the car information of the uninspected car stored in the car information storage unit (13,14) in a state where the same car information is not searchable by the search unit, and the car information storage unit (13, 14) changes the car information to a searchable state in accordance with an input of the car inspection information created from the inspection based on the inspection indicative information.

According to another aspect of the present invention, a car sale information providing method comprises a step of displaying car information containing at least a name, a type, a year model of a car and inspection information of the car on a display screen on a terminal device connected to a host device.

According to a further aspect of the present invention, a car dealing system comprises a car information storage unit (13, 14, 52) for storing car information containing at least a name, a type, a year model of a car, an exhibit information storage unit (13, 14, 53) for storing mappings of plural categories of exhibit information containing at least animated image data or sound data (including voice data) to the car information, a search unit (12) for searching the car information, a header display unit for displaying a header of each items of car information as a result of the search in a selectable manner, and a display unit (16) for outputting car screen information when the header is selected, including an output indication interface (55) for giving an indication of outputting, the car information with its header selected and an indication of outputting exhibit information corresponding to the car information outputted.

In this car dealing system, the car information storage unit (13, 14, 52) maybe stored with mappings of the car information to car inspection information as a result of inspecting the car concerned, and the display unit (16) may further display the car inspection information corresponding to the car information.

In this car dealing system, the display unit (16) may further include a purchase indication interface (44) for transmitting a piece of information for purchasing the car concerned.

As described above, according to the present invention, the car inspection information or the exhibit information containing the animated image data and the sound data is outputted together with the car information, and it is therefore feasible to speed up the process that the prospective buyer of the used car determines the intention of purchasing it.

BRIEF DESCRIPTION OF THE DRAWINGS

FIG. 5 is a diagram showing a completion-of-registration screen;

FIG. 7 is a diagram showing a purchase screen in the first embodiment;

FIG. 17 is a chart showing a data structure of a used-car database;

FIG. 18 is a chart showing a data structure of an exhibit information database;

FIG. 19 is a diagram showing a display screen for a list of searched results;

FIG. 20 is a diagram showing a purchase screen in the second embodiment; and

DETAILED DESCRIPTION OF THE INVENTION

Preferred Embodiments of the present invention will hereinafter be described with reference to the accompanying drawings.

<<First Embodiment>>

A first embodiment of the present invention will be discussed referring to FIGS. 1 through 15.

Figure 1:
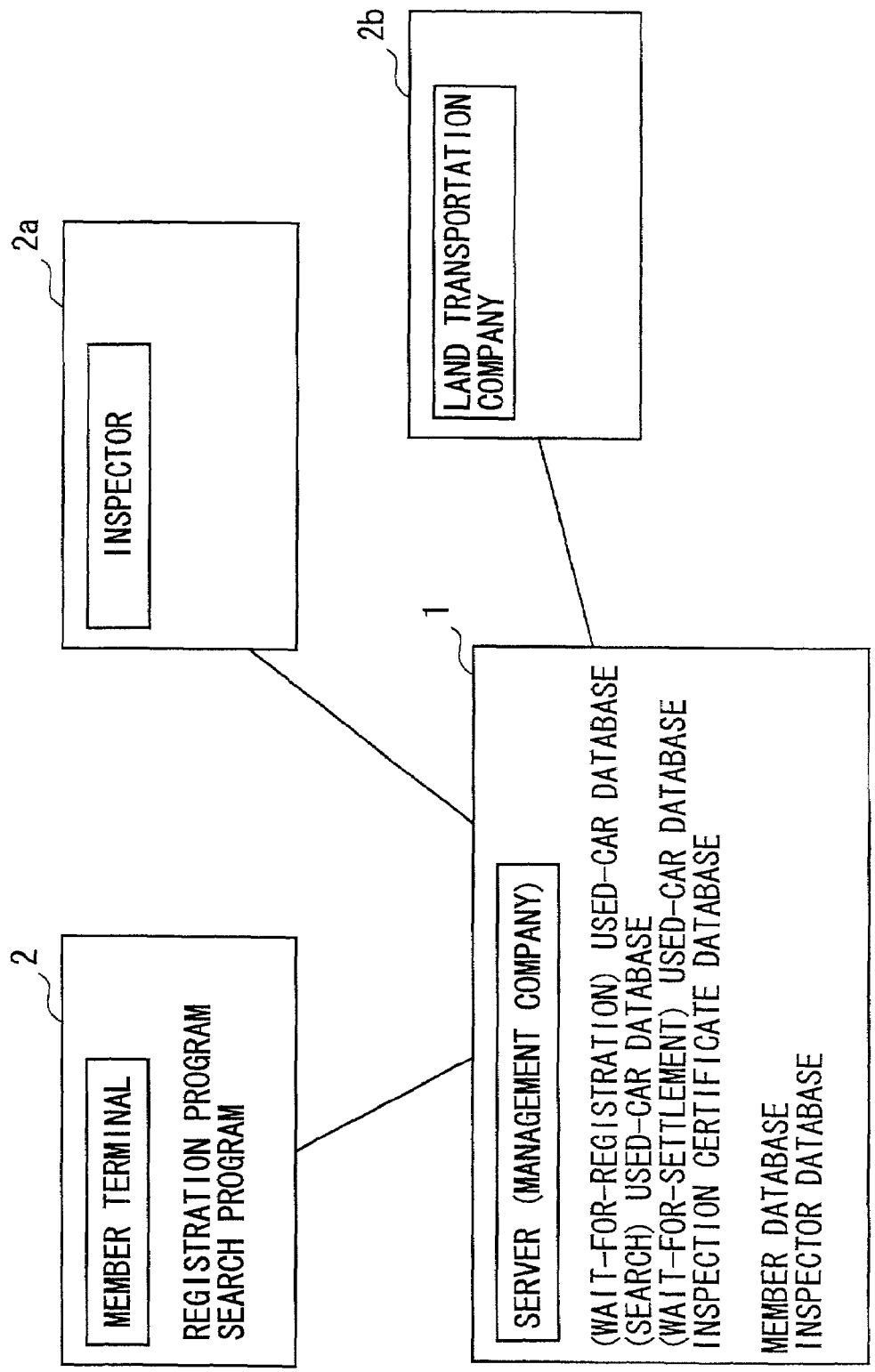
FIG. 1 is a diagram showing a system architecture of a car sale information providing system in a first embodiment of the present invention.
Figure 2:
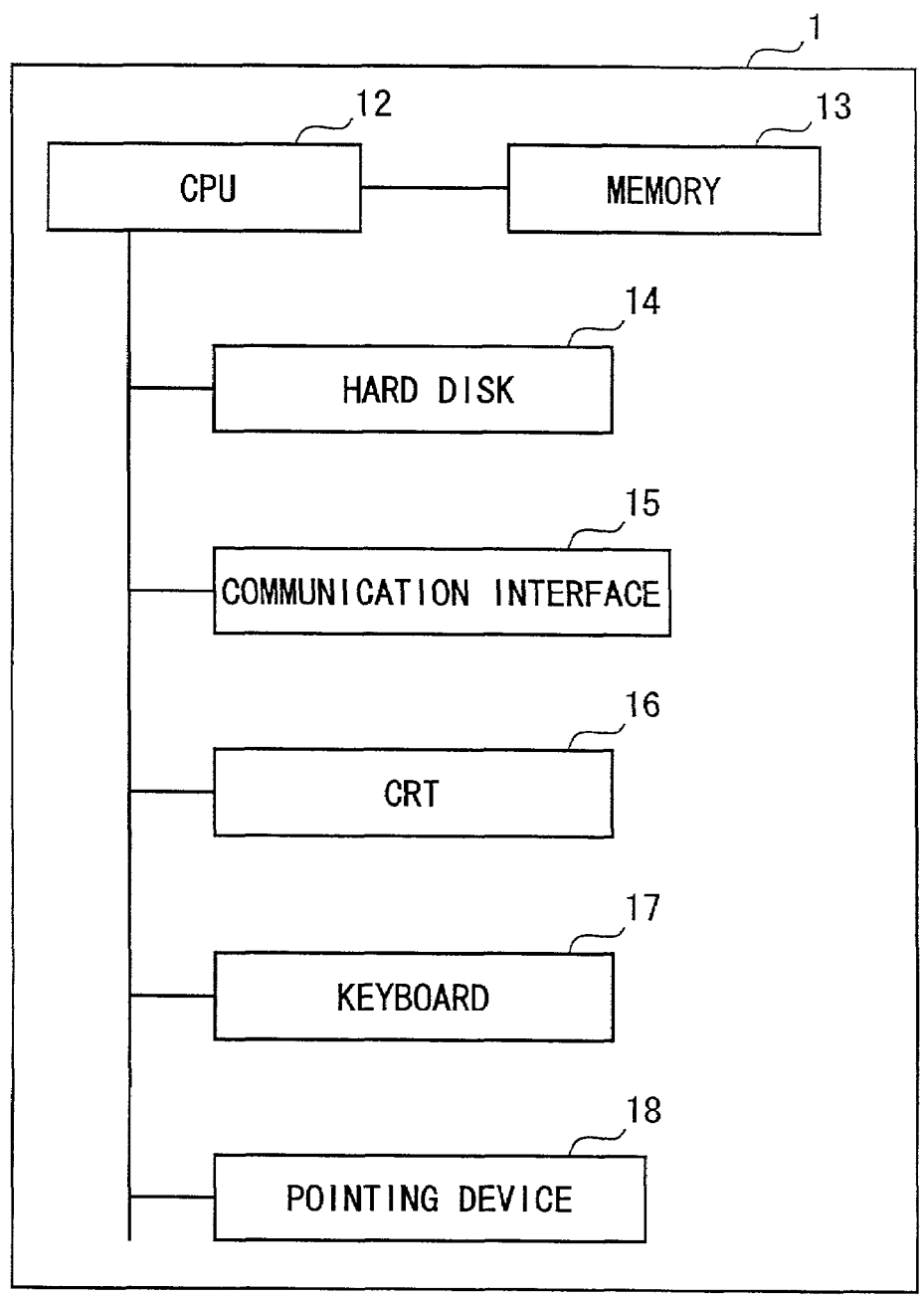
FIG. 2 is a diagram showing a hardware architecture of a server 1.
Figure 3:
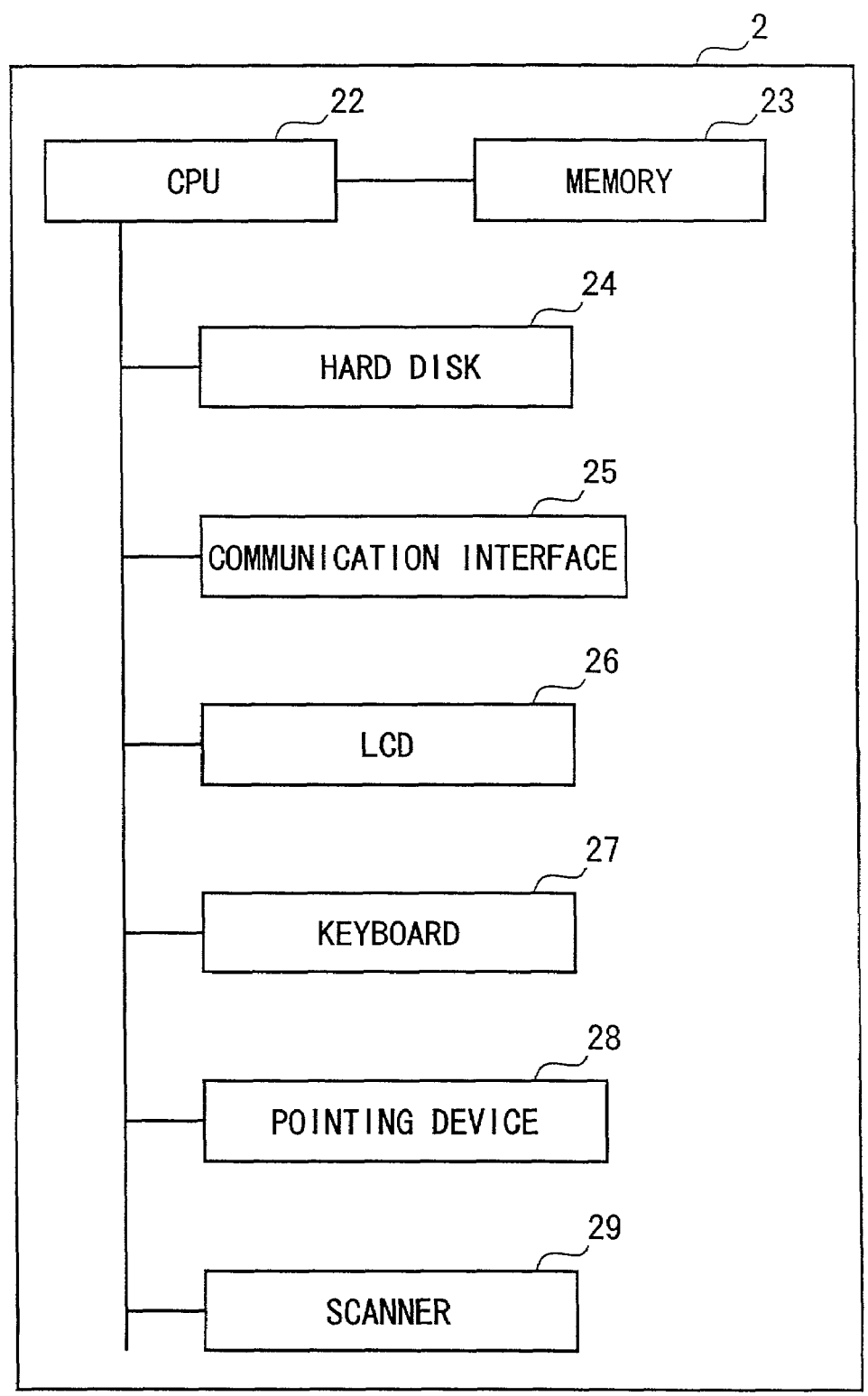
FIG. 3 is a diagram showing a hardware architecture of a terminal device 2.
Figure 14:
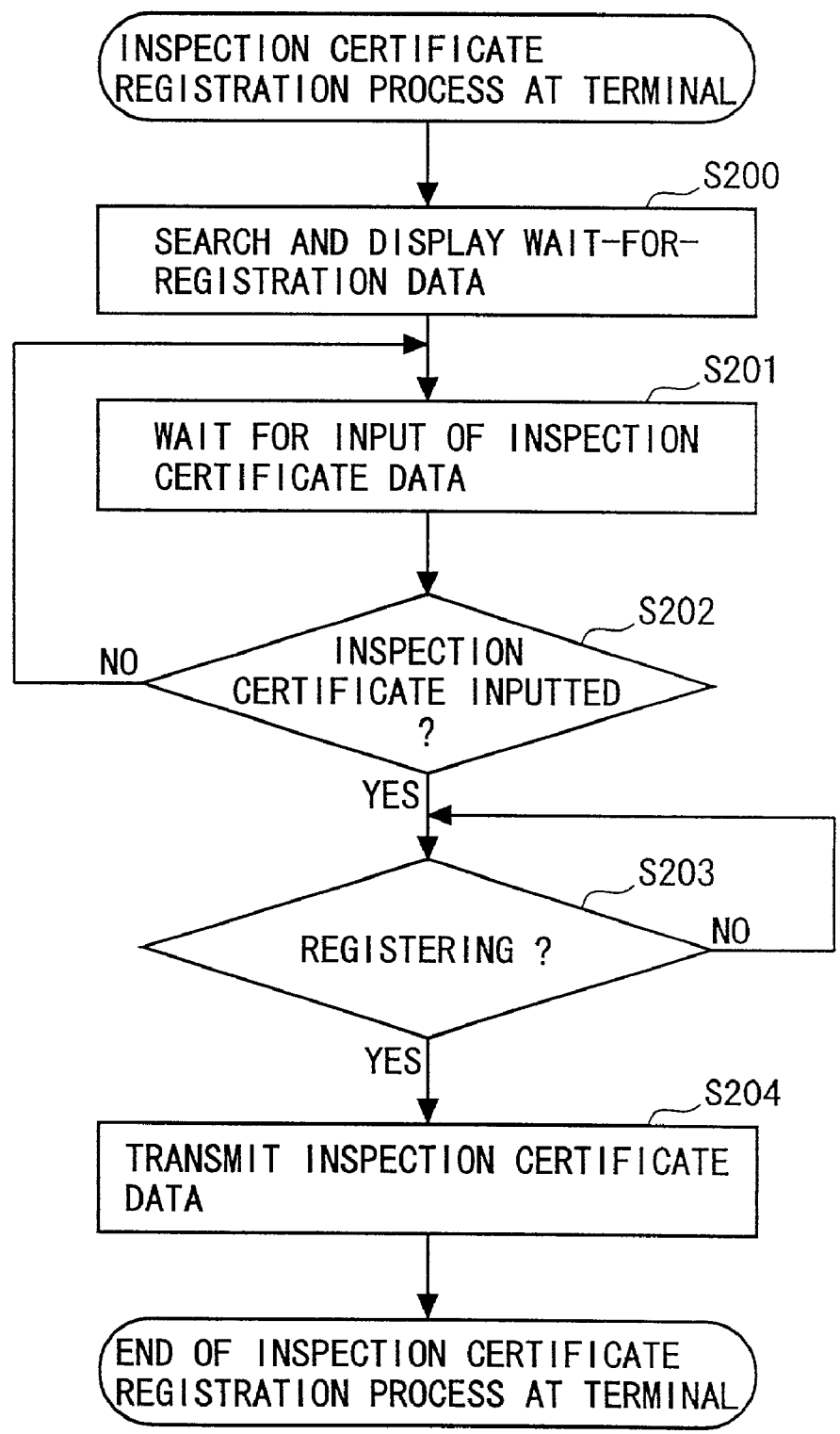
FIG. 14 is a flowchart showing an inspection certificate registration process of a terminal device 2.
Figure 15:
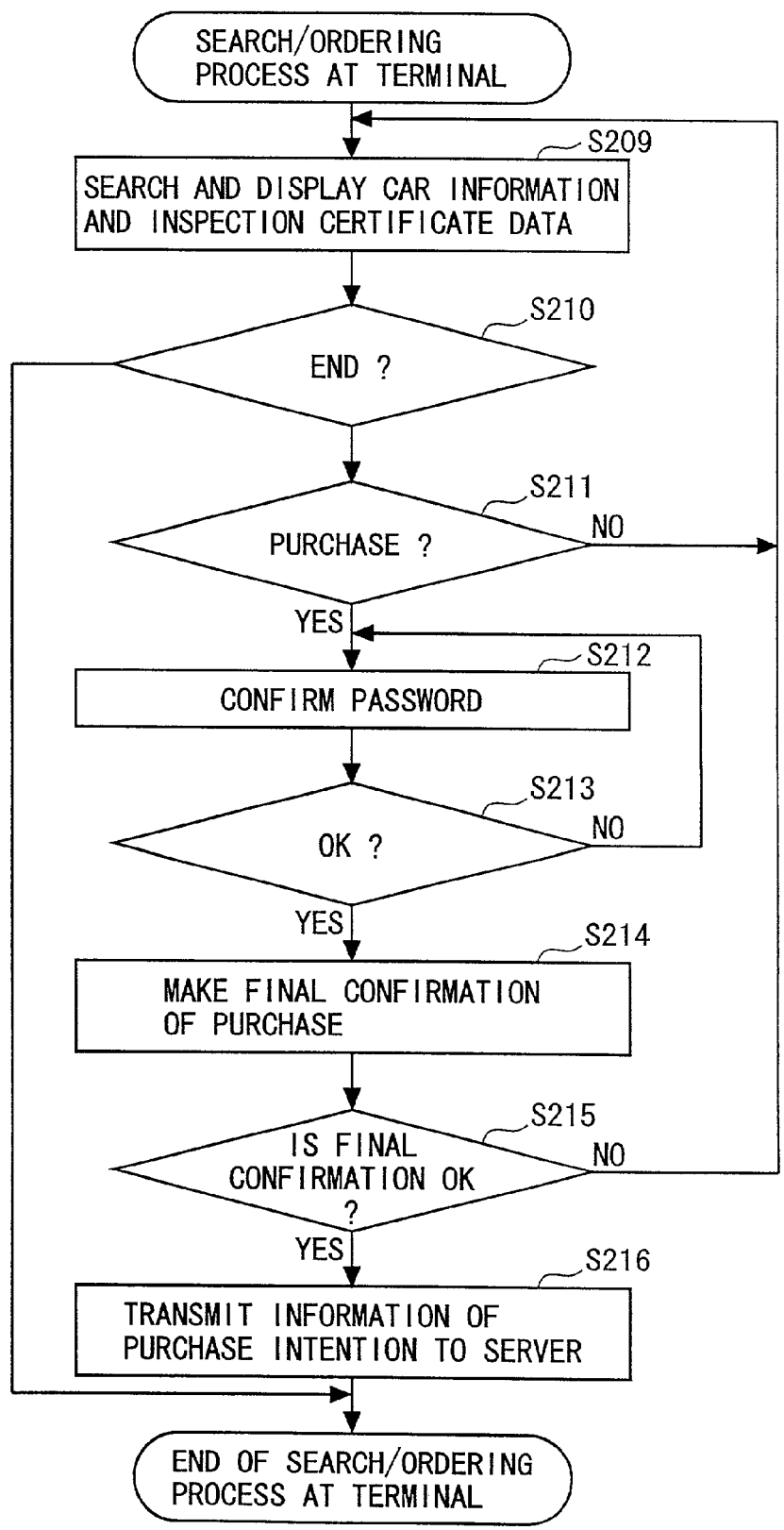
FIG. 15 is a flowchart showing a search/ordering process of a terminal device 2.

FIG. 1 is a diagram showing a system architecture of a car sale information providing system in the first embodiment of the present invention. FIG. 2 is a diagram showing a hardware architecture of a server 1 shown in FIG. 1. FIG. 3 is a diagram showing a hardware architecture of a terminal device such as a member terminal 2 illustrated in FIG. 1. FIGS. 8 through 13 are flowcharts each showing processes of a server program executed by a CPU 12 of the server 1. FIGS. 14 and 15 are flowcharts each showing processes of a program executed in the terminal device such as the member terminal 2.

<System Architecture>

FIG. 1 shows the system architecture of the car sale information providing system. This system is configured by the server 1 installed in a management company for managing the information, the member terminals 2 installed in sales companies that sell the cars or in homes in users who purchase the cars, an inspector terminal 2a installed in an office of an inspector, and a land transportation company terminal 2b installed in a land transportation company.

The server 1 includes a used-car database for recording pieces of data such as a name, a type, a year model etc of the car, an inspection certificate database for recording inspection certificate data defined as a result of inspecting the car, a member database for recording members accessing the server 1, and an inspector database for recording the inspectors who inspect the car.

Among those databases, the used-car database is structured of a wait-for-registration database, a search database and a wait-for-settlement database.

The wait-for-registration database in the used-car database is registered with uninspected cars with no inspection certificate data.

The search database in the used-car database, to which the inspection certificate data is inputted, is registered with purchase target cars of the members.

The wait-for-settlement database in the used-car database is, after the members have applied for purchasing the cars, registered with these wait-for-settlement cars.

In the member terminal 2, a registration program for registering the sales target cars or a search program for searching the cars to be purchased, is executed. With this execution of the program, the member terminal 2 accesses the server 1, thereby providing a function of registering or searching the car information, or a purchase application function.

The inspector terminal 2a notifies the inspector of an inspecting indication. Further, the inspector terminal 2a, when the inspector inputs the inspection certificate data as a result of inspecting the car, transmits this inspected result to the server 1.

The server 1 transmits indicative information for indicating a land transportation of the car to be sold to the land transportation company terminal 2b. The member terminal 2, the inspector terminal 2a and the land transportation company terminal 2b are here in after generically called a terminal device.

<Hardware Architecture>

FIG. 2 shows a hardware architecture of the server 1. The server 1 includes a CPU 12 for executing a server program, a memory 13 for storing the server program executed by the CPU 12 and data processed by the CPU 12, a hard disk 14 for recording the server program and the data, a communication interface 15 for communicating with the terminal device such as the member terminal 2 etc, a CRT 16 for displaying a result of processing by the CPU to the user, a keyboard 17 for the user to input the data, and a pointing device 18 for the user to manipulate menu or icons etc.

The CPU 12 executes the server program stored in the memory 13, thereby providing a function as the server 1.

The memory 13 stores the server program executed by the CPU 12 and the data processed by the CPU 12.

The hard disk 14 is recorded with the server program executed by the CPU 12. Further, the wait-for-registration database, the search database, the wait-for-settlement database, the member database and the inspector database, are structured on the hard disk 14.

The communication interface 15 accesses an unillustrated network in response to a command given from the CPU 12, and communicates with the member terminal 2, the inspector terminal 2a and the land transportation company terminal 2b.

The CRT 16 displays the data inputted by the user and a result of the processed data. Other display devices such as a liquid crystal display device etc may also be used as a substitute for the CRT 16.

The keyboard 17 is used for the user to input the character information. The pointing device 18 maybe, for example, a mouse, trackball an electrostatic pointing device, an optical pointing device and a touch panel. The pointing device 18 is used for the user to manipulate the menus and icons displayed on the CRT 16.

FIG. 3 shows the hardware architecture of the terminal device. The terminal device includes a CPU 22, a memory 23, a hard disk 24, a communication interface 25, an LCD 26, a keyboard 27, a pointing device 28 and a scanner 29.

The hardware architecture of the terminal device is substantially the same as the server 1, however, a different point from the server 1 is that the terminal device includes the LCD 26 in place of the CRT 16 and the scanner 29 for generating pieces of image data of a car photo and of an inspection certificate.

<Operating Procedure>

[Registration of Car Information]

Figure 4:
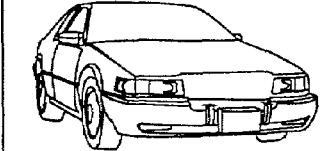
FIG. 4 is a diagram showing a registration screen.

FIG. 4 shows a registration screen registering information of the used-car (which will hereinafter be called car information). The registration screen is displayed on the LCD 26 when the member operates the member terminal 2 to register the sales car in the server 1.

On the registration screen, two columns of information input boxes are laid out on the right and left sides. The left-sided input boxes on the screen are topped by a member number and followed by a name of car maker, a type of car, a name of car, a grade, a shape, an application, an external coating color, a color No. (of coating), an interior coating color, a type of fuel, a gearshift mode, air-conditioned or non-air-conditioned, other equipment, a possible-delivery car delivery date and a sales price.

Further, the right-sided input boxes on the screen are topped by a frame number and followed by a displacement, a safety check expiration date, a mileage and a sales point. Displayed further are a [photo input] button for inputting a car photo, an [inspection certificate input] button 40 for inputting the inspection certificate data, and a [registration] button 41 for registering the inputted-to-the-screen information in the used-car database.

Among those input boxes, an arbitrary comment of the car dealer may be inputted to the [sales point] box. For example, a comment such as [supreme car] etc is inputted thereto.

When pressing the [photo input] button, there is displayed an unillustrated input box for inputting a name of an image file, or an unillustrated indication screen for indicating a take-in of the image to a scanner 29 compatible with TWAIN (Technology Without Any Interested Name defined as a common interface specification for controlling the scanner, which is designed in cooperation by Hewlett-Packard Corp., U.S.A., Eastman Kodak Corp., U.S.A., Logitech Corp., U.S.A., Aldus Corp., U.S.A., and Caere Corp., U.S.A.)

Note that the inspection certificate data among those input items is normally inputted by the special inspector, and may therefore not yet be inputted when making the registration.

The dealers, if inspecting by themselves based on predetermined rules, select inputting the inspection certificate by pressing the [inspection certificate input] button 40 or submitting the inspection certificate by mail. In the case of the inputting, the inspection certificate is inputted as an image of the check record in the same way as by the [photo input] button.

In the case of selecting the submission by mail, the member terminal 2 notifies the server 1 of this purport. In this case, a car management number is given when the registration is completed, and hence the inspection certificate with the management number put on is mailed. Alternatively, a form for mailing the inspection certificate may be printed when the registration is completed.

After inputting pieces of data to the respective input boxes, the car information including the photo and the inspection certificate data (in the case of the member's inputting by himself or herself) on the screen in FIG. 4, when the [registration] button 41 is pressed by the pointing device 28, the pieces of car information are transmitted from the member terminal 2 to the server 1.

[Registration Process in Server 1]

The server 1 checks whether or not the information received contains the inspection certificate data. If the information received contains the inspection certificate data, the server 1 generates a car management number based on the predetermined rule.

Further, the server 1 newly registers the car data in the search database and the inspection certificate data in the inspection certificate database. At this time, sets of data registered in the search database and in the inspection certificate database, are each given a car management number that will be used as a search key when the set of data is searched. Thereafter, the server 1 is to transmit pieces of data on a completion-of-registration screen in FIG. 5 to the member terminal 2. As shown in FIG. 5, on the completion-of-registration screen, a string of characters of [supreme car] is displayed in the [sales point] box, a car photo is displayed in the [photo] box, and inspection certificate data are displayed in the [inspection certificate] box.

If specified to submit the inspection certificate data by mail, the server 1 generates the car management number based on the predetermined rule, and registers the transmitted car information in the wait-for-registration database. Thereafter, the server 1 transmits the data on the completion-of-registration screen shown in FIG. 5 to the member terminal 2. At this time, however, a remark "not yet inputted" is displayed in the inspection certificate box.

[Inspection Indication from Server 1]

The server 1, if the car information containing no inspection certificate data are inputted, obtains an address of the registered member from the member database and further an inspector residing in the vicinity of that address from the inspector database, and notifies this inspector of the inspection indicating information.

This item of inspection indicating information contains the address of the registered member, a name, the car information registered in the wait-for-inspection database, and the car management number. The notification of the inspection indicating information may take some methods such as transmitting it via the network to a special output device installed in an inspector office, or by E-mail or by facsimile, or mailing it in a printed form. Pieces of destination information of the inspector such as a mail address, a facsimile number and an address necessary for those processes, are stored beforehand in the inspector database.

[Registration of Inspection Certificate]

The inspector, upon receiving the inspection indicating information, goes to where the car exists and checks it. The car is stored in the office where the inspector terminal 2a is installed. The inspector registers the inspection certificate recorded with a result of having inspected the car by use of the inspector terminal 2a.

Figure 6:
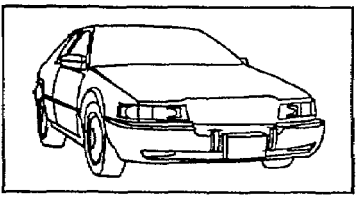
FIG. 6 is a diagram showing an inspection certificate registration screen.

FIG. 6 shows a screen for registering the inspection certificate. When the inspector starts an inspection certificate registration program on the inspector terminal 2a and inputs a car management number of the inspection target car, the inspector terminal 2a accesses the server 1, then reads a corresponding item of car information out of the wait-for-registration database, and displays the data in respective boxes on the screen in FIG. 6.

The inspector confirms from the data displayed that the car inspected is identified by the car information registered.

An inspection record sheet is set in the scanner 29 connected to the inspector terminal 2a, and an [inspection certificate input] button 42 is pressed by the pointing device 28. Then, the scanner functions, and images on the inspection record sheet are taken into the inspector terminal 2a. Thereafter, a [registration] button 43 is pressed, thereby transmitting the car management number and the images on the inspection record sheet to the server 1.

The server 1 transfers a record of the car information indicated by the received car management number to the search database from the wait-for-registration database. Further, the server 1 records the received inspection certificate data (the image data of the inspection record sheet) with the car management number in the inspection certificate database.

[Search and Online Dealing (on the Side of Member Terminal)]

FIG. 7 shows a purchase screen displayed when the member purchases a car. The screen is displayed, when starting the search program on the member terminal 2 and specifying items to identify car information such as a "name of maker", a "name of car", a "price" etc. At this time, the member terminal 2 accesses the search database and the inspection certificate database of the server 1, and displays the car information related to the specified items.

When the member presses a button 44 on this display screen, an unillustrated window for a purchaser to input a member number thereof and a password for authentication, is displayed.

Next, the member terminal 2 displays the car information and pieces of data such as a car dealing price, a land transportation cost etc on an unillustrated screen, thus getting these pieces of data finally confirmed by the purchaser to buy the car.

Moreover, the server 1, because of the memory 13 being stored with a table of land transportation costs in which each cost is set corresponding to a delivery place and an arrival place, notifies the member terminal 2 of a land transportation cost.

When getting a confirmation of the purchase on an unillustrated final confirmation screen, purchase information (containing a car management number and a purchaser member number) is transmitted to the server 1 from the member terminal 2.

[Search and Online Dealing (on the Side of Server)]

The server 1 refers to the search database and obtains a sales member number with the car management number used as a key. Next, the server 1 refers to the member database and obtains pieces of information on the sales member and the purchaser member therefrom.

Subsequently, the server 1 sends land transportation indicative information (containing the car management number, the car information recorded in the search database, and the information on the purchaser member) of the car concerned to the sales member.

The sending of this item of land transportation indicative information may take some methods such as transmitting it via the network to a special output device installed in a member office, or by E-mail or by facsimile, or mailing it in a printed form.

Next, the server 1 transfers the same car information to the wait-for-settlement database from the search database.

[Settlement]

Depending on an option of the member, the settlement may be made between the members, or the management company may be commissioned to make the settlement, or an electronic settlement may be implemented by the server 1.

If the management company is commissioned to make the settlement, after confirming a payment of the fee (transferred to a bank account specified) by the purchaser member, an indication of the land transportation is given.

If the dealing is not established for some reason, for example, according to the operation rule such as "The dealing shall be unestablished in case no payment is implemented by 14:00 the day after the purchase indicated date" and so forth, the server 1 transfers the same car information to the search database from the wait-for-settlement database, and the car concerned is put open to the market.

The land transportation company tied up with the management company is notified of the land transportation indicative information (containing the car management number, the car information recorded in the search database, the sales member information (delivery place), the purchaser member information (destination of the land transportation) etc) in the same way as sending to the sales members.

<Function and Effects>

FIGS. 8 through 13 show the processes of the server program executed by the CPU 12 of the server 1. The CPU 12, when the system is booted, executes the server program, thereby providing a function of the server 1.

Figure 8:
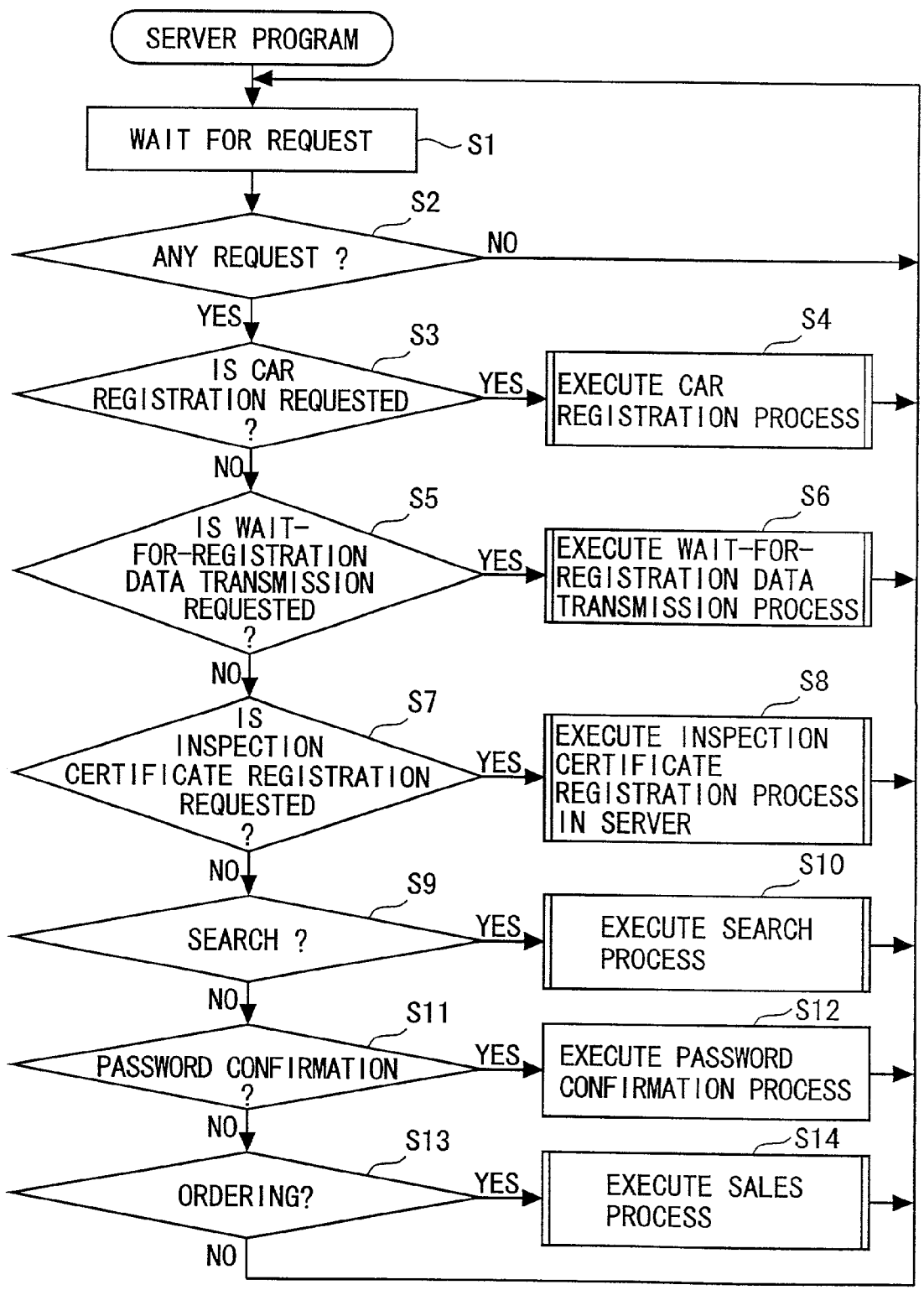
FIG. 8 is a flowchart showing processes of a server program.

As shown in FIG. 8, normally the CPU 12 is in a standby status for a request given from the terminal device (from S1 to S2). If given the request via the unillustrated network (Yes in S2), the CPU 12 makes a judgement about a type of the request.

To start with, the CPU 12 judges whether or not the request is a car registration request (S3). If the request is the car registration request, the CPU 12 executes a car registration process (S4). Thereafter, the CPU 12 sets the control back to the standby status for the request (S1).

Whereas if not the car registration, the CPU 12 judges whether or not the request is a wait-for-registration data transmission request (S5). If judged to be the wait-for-registration data transmission request, the CPU 12 executes a wait-for-registration data transmission process (S6) Thereafter, the CPU 12 loops the control back to the standby status for the request (S1).

Whereas if not the wait-for-registration data transmission request, the CPU judges whether or not the request is an inspection certificate registration request (S7). If being the inspection certificate registration request, the CPU 12 executes an inspection certificate registration process (S8). Thereafter, the CPU 12 again loops the control back to the standby status for the request (S1).

Whereas if not the inspection certificate registration request, the CPU 12 judges whether the request is a search or not (S9). If judged to be the search, the CPU 12 executes a search process (S10). Thereafter, the CPU 12 returns the control to the standby status for the request (S1).

Whereas if not the search, the CPU 12 judges whether or not the request is a password confirmation request (S11). If the request is the password confirmation request, the CPU 12 executes a password conformation process (S12). Thereafter, the CPU 12 returns again the control to the standby status for the request (S1).

Whereas if not the password confirmation request, the CPU 12 judges whether or not the request is an ordering request (S13) If judged to be the ordering request, the CPU 12 executes a sales process (S14). Thereafter, the CPU 12 loops again the control back to the standby status for the request (S1).

Whereas if not the ordering request, the CPU 12 executes nothing and returns again the control to the standby status for the request (S1).

Figure 9:
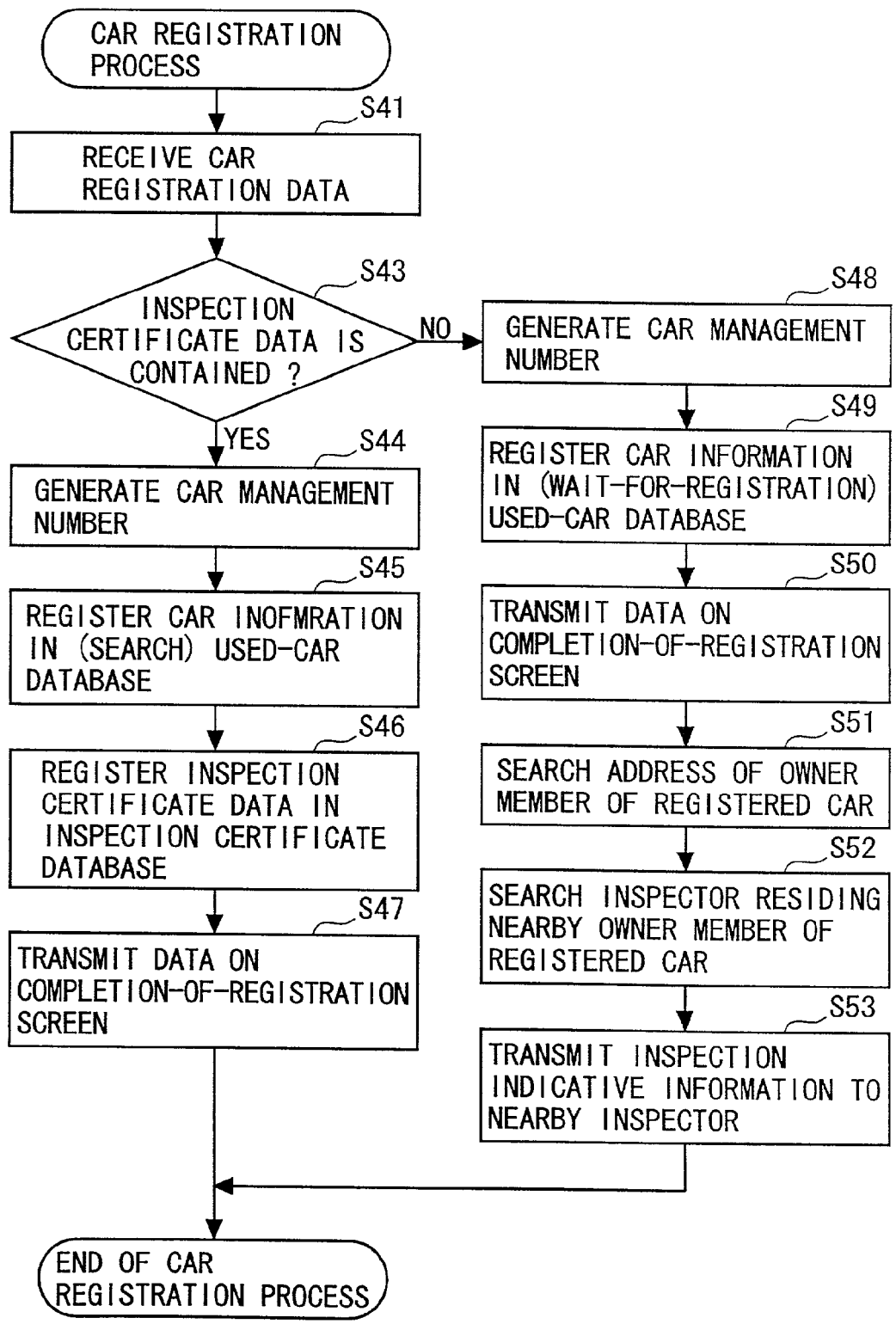
FIG. 9 is a flowchart showing a car registration process of the server 1.

FIG. 9 shows details of the car registration process (S4 in FIG. 8). At first, the CPU 12 receives the car registration data (car information) from the terminal device (S41).

Next, the CPU 12 checks whether or not the car registration data received contain the inspection certificate data (S43) If the car registration data received contain the inspection certificate data, the CPU generates a car management number according to the predetermined rule (S44).

Next, the CPU 12 registers the car information in the search database (S45).

Subsequently, the CPU 12 registers the inspection certificate data in the inspection certificate database (S46).

Next, the CPU 12 transmits the data on the completion-of-registration screen in FIG. 5 to the member terminal 2 (S47). Thereafter, the CPU 12 finishes the car registration process.

Whereas if the car registration data received do not contain the inspection certificate data, the server 1 generates the car management number in accordance with the predetermined rule (S48).

Next, the CPU 12 registers the transmitted car information in the wait-for-registration database (S49). Subsequently, the server 1 transmits the data on completion-of-registration screen in FIG. 5 to the member terminal 2 (S50). At this time, however, a remark "not yet inputted" is displayed in the "inspection certificate" box.

Subsequently, the CPU 12 obtains an address of the registered member from the member database (S51).

Next, the CPU 12 obtains the inspector residing in that address from the inspector database (S52). Then, the CPU 12 sends the inspection indicative information to this inspector (S53). Thereafter, the CPU 12 finishes the car registration process.

Figure 10:
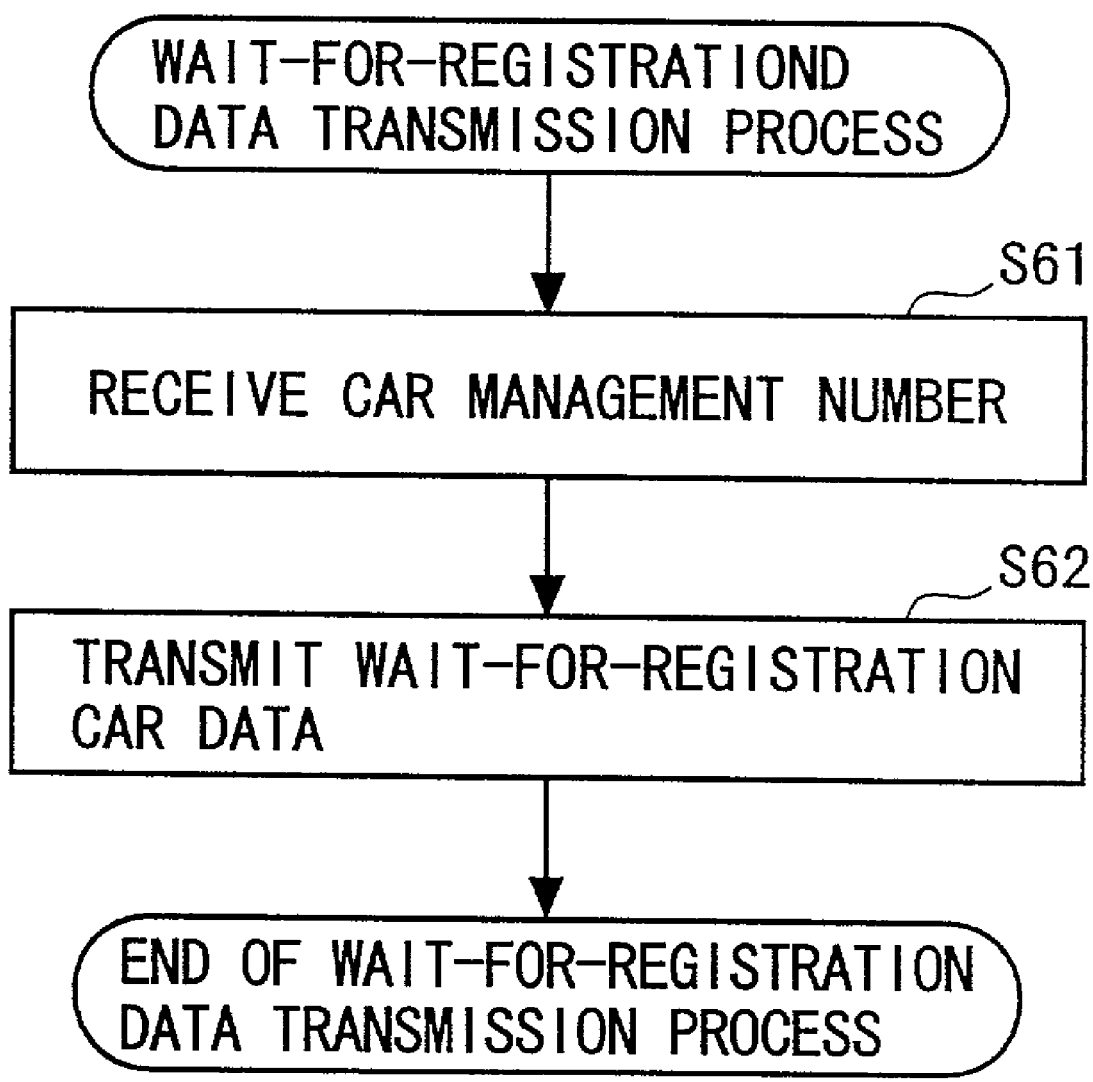
FIG. 10 is a flowchart showing a data transmission process of the server 1.

FIG. 10 shows details of the wait-for-registration data transmission process (S6 in FIG. 8). To begin with, the CPU 12 receives the car management number from the terminal device (S61). Next, the CPU 12 searches the wait-for-registration database, and transmits a piece of wait-for-registration data of that car management number to the terminal device (S62). Thereafter, the CPU 12 finishes the wait-for-registration data transmission process.

Figure 11:
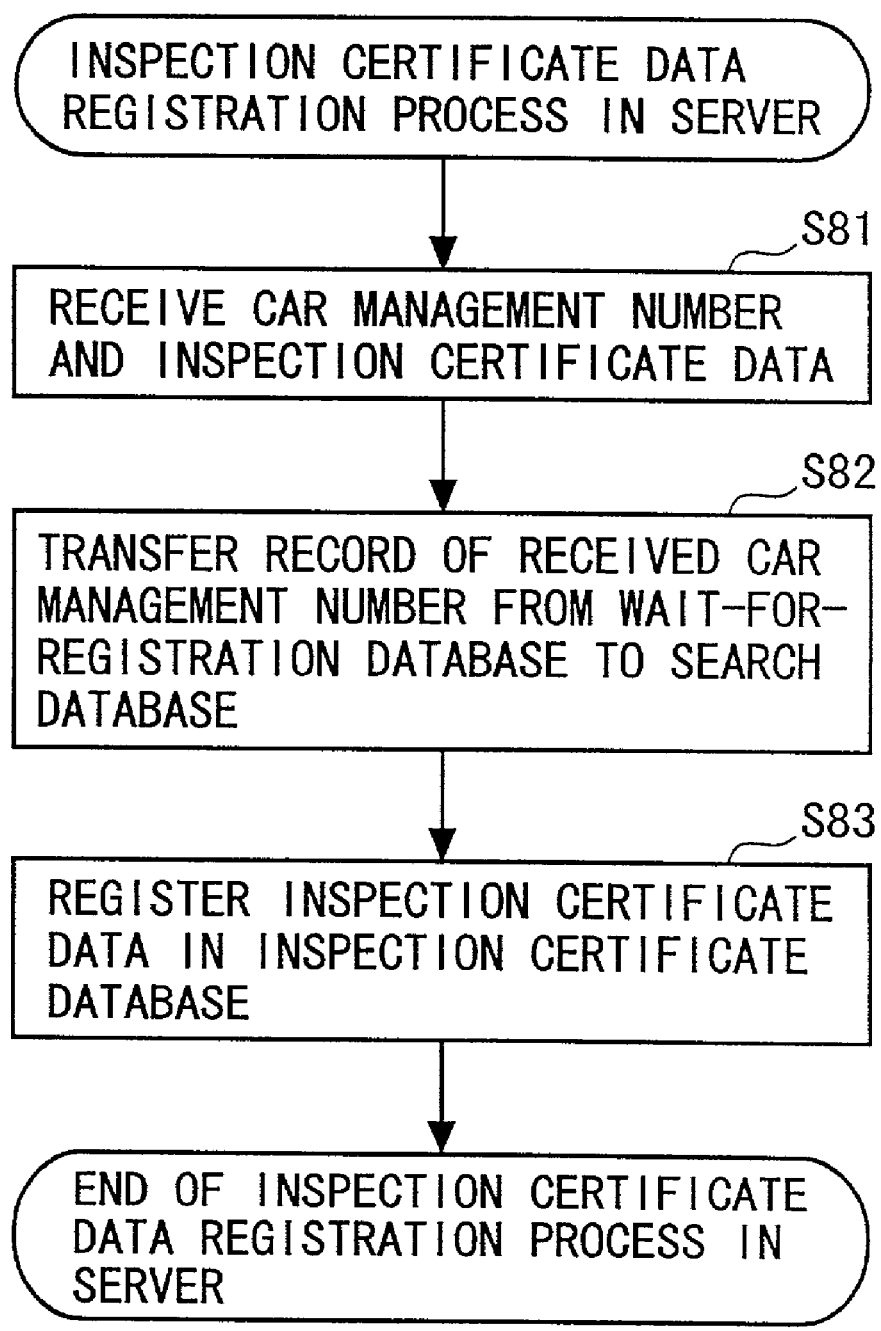
FIG. 11 is a flowchart showing an inspection certificate registration process of the server 1.

FIG. 11 shows details of the inspection certificate data registration process (S8 in FIG. 8) in the server 1. At first, the CPU 12 receives the car management number and the inspection certificate data from the terminal device (S81).

Next, the CPU 12 transfers a record of the car information indicated by the received car management number to the search database from the wait-for-registration database (S82). Next, the CPU 12 records the received inspection certificate data (which are the image data on the inspection record sheet) with the car management number in the inspection certificate database. Thereafter, the CPU 12 comes to an end of the wait-for-registration data transmission process.

Figure 12:
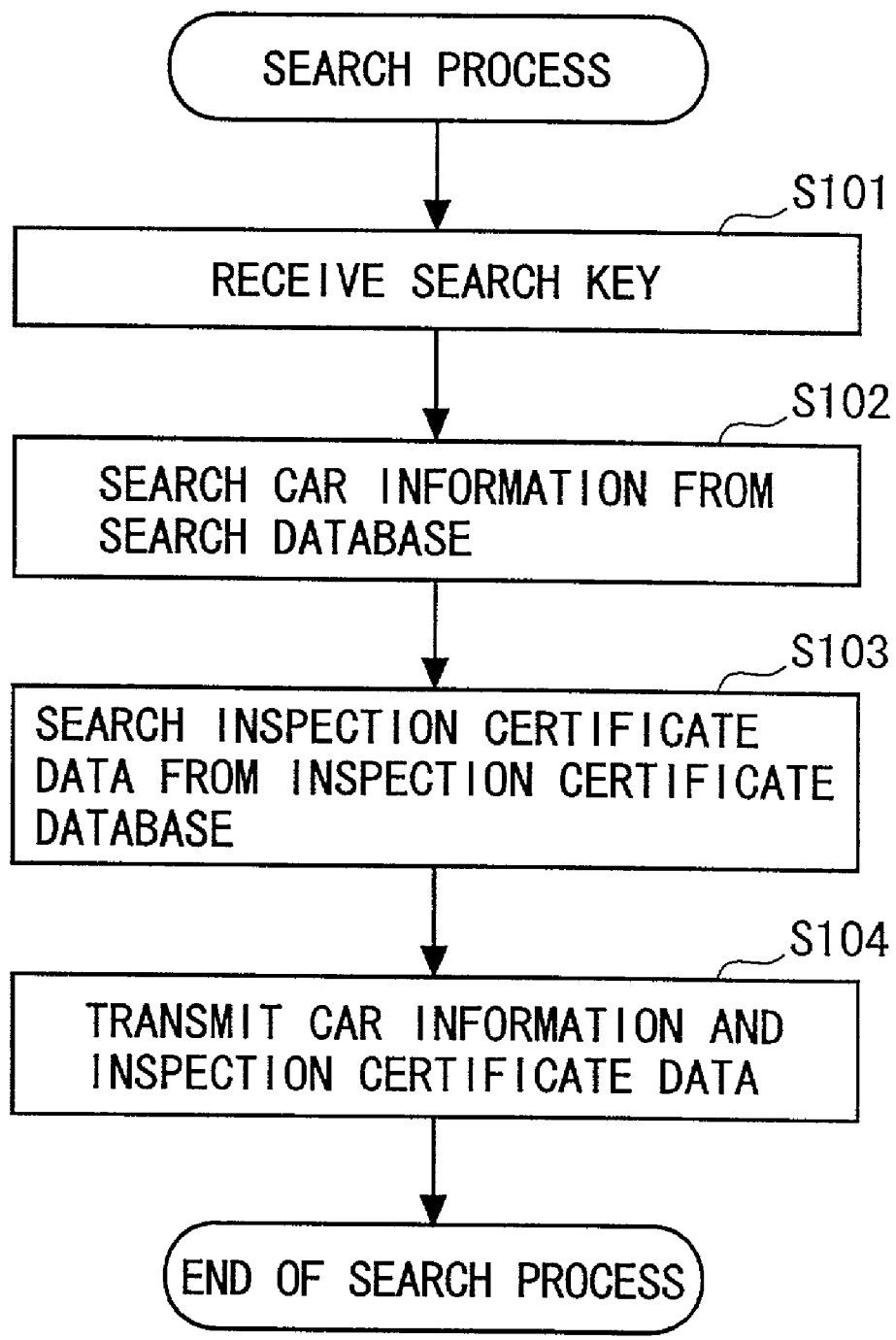
FIG. 12 is a flowchart showing a search process of the server 1.

FIG. 12 shows details of the search process (S10 in FIG. 8). On the first onset, the CPU 12 receives search keys (a name, a type, a year model and a displacement of the car) specified by the member (S101).

Subsequently, the CPU 12 searches the car information from the search database (S102). At this time, the CPU 12 gets the car management number.

Next, the CPU 12 searches the inspection certificate data from the inspection certificate database based with this car management number used as a key (S103).

Then, the CPU 12 transmits the car information and the inspection certificate data to the terminal device (S104). Thereafter, the CPU 12 finishes the search process.

Figure 13:
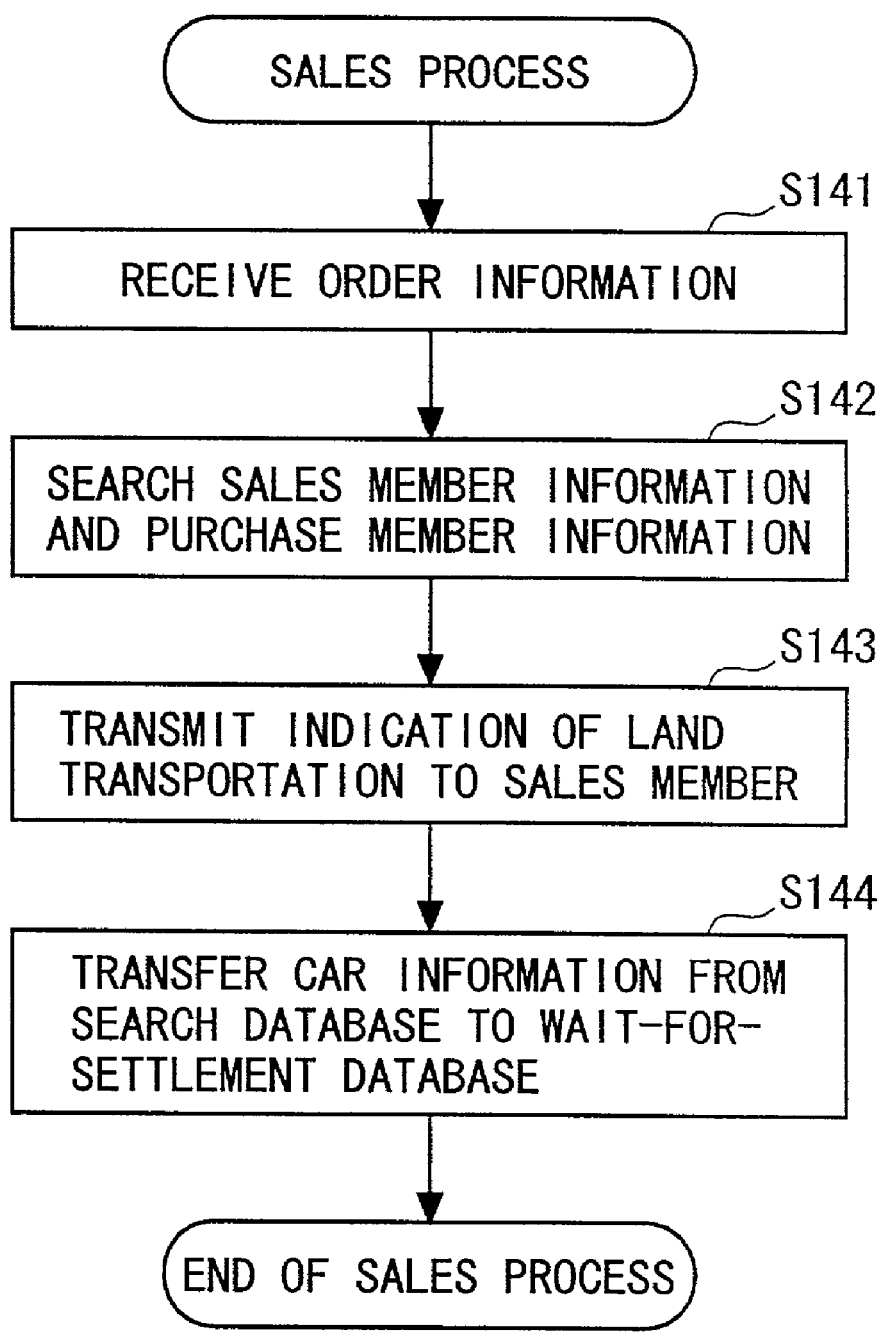
FIG. 13 is a flowchart showing a sales process of the server 1.

FIG. 13 shows details of the sales process (S14 in FIG. 8). To start with, the CPU 12 receives the ordering information (containing a car management number of an order target car, and a purchaser member number) from the terminal device (S141).

Next, the CPU 12, with the car management number used as the key, obtains the member number of the sales member from the search database. Then, the CPU 12, based on the member number of the sales member and the member number of the purchaser member, searches pieces of information (addresses and so forth) on the sales member and the purchaser member out of the member database (S142).

Next, the CPU 12 sends the land transportation indicative information to the sales member (S143).

Subsequently, the CPU 12 transfers the car information from the search database to the wait-for-settlement database (S144). Thereafter, the CPU 12 finishes the sales process.

FIGS. 14 and 15 show processes of programs executed in the inspector terminal 2a and the member terminal 2. A CPU 22 of the member terminal 2 executes the program, thereby providing functions as the inspector terminal 2a and the member terminal 2.

FIG. 14 shows an inspection certificate registration process in the inspector terminal 2a. In this process, the CPU 22 at first prompts the inspector to input a car management number and also the server 1 to search wait-for-registration data corresponding to the inputted car management number, and displays a searched result on the LCD 26 (S200). At this time, the inspector confirms the wait-for-registration car information.

Next, the CPU 22 comes to a standby status for inputting the inspection certificate data (S201). When the inspector sets the inspection record sheet in the scanner 29 and presses the [inspection certificate input] button 42, the CPU 22 detects an indication of the registration (Yes in S202).

Then, the CPU 22 waits for the [registration] button 43 to be pressed (S203). When the [registration] button 43 is pressed, the CPU 22 transmits to the server 1 the inspection certificate data read from the scanner 29 (S204). Thereafter, the CPU 22 finishes the inspection certificate registration process.

FIG. 15 shows a search/ordering process in the member terminal 2. In this process, the CPU 22 indicates the server 1 to search the car information based on the specified search conditions (the name, type, year model and displacement of the car), and displays the searched result on the LCD 26 (S209).

If the member does not desire for purchasing and gives an indication of end (Yes in S210), the CPU 22 finishes the search/ordering process.

If the member desires not for the purchase but for the search to be performed again (No in S211), the CPU 22 returns the control to the process in S209.

When the member presses the [purchase] button 44 (Yes in S211), the CPU 22 prompts the member to input a password, and inquires the server 1 about whether the password is identified by the member number or not (S212).

If the password is authenticated, the CPU 22 gives a clear display of pieces of car information, a purchase price, a land transportation cost etc, and gets these pieces of data confirmed finally (S214).

If the final confirmation is OK, the CPU 22 notifies the server 1 of a piece of information showing an intention of the purchase (S216). Thereafter, the CPU 22 finishes the search/ordering process.

Whereas if the member does not consent in the final confirmation (No S215), the CPU 22 returns the control to S209, and executes searching a next set of car information.

As discussed above, according to the present information system, the prospective buyer of the used-car is able to refer to the inspection data of the used-car concerned together with the car information on the specifications of the used-car searched from the database. Therefore, the present information system speeds up a decision making process of the prospective buyer of the used-car concerned.

Further, according to the present information processing system, the dealer is able to search the car information while looking at on the screen with the customer, and able to refer to the inspection certificate data of the used-car concerned together with the car information. Therefore, an establishment of the dealing is speeded up. Further, it is feasible to reduce a period for the dealer to make the arrangements for the goods (the dealing car), whereby the demand of the customer can be quickly met.

<Modified Examples on Registration Screen>

In accordance with the embodiment discussed above, the inspection certificate data is inputted as the image on the inspection record sheet. The embodiment of the present invention is not, however, limited to the above input mode and display mode of the inspection certificate. For instance, the inspection certificate data may be inputted as code data to input boxes provided for every check item of the check record, and the data may be recorded and displayed for every check item.

Further, the embodiment of the present invention is not confined to the input device and the input time of the inspection certificate data. For instance, the inspector may mail the inspection record sheet to the management company without using the inspector terminal 2a. The management company having received the inspection record sheet may register the inspection certificate in the same procedure as by mailing from the member.

In the embodiment discussed above, the car information is inputted from on the registration screen of the member terminal 2. Instead of this input mode, a register sheet with entries of necessary items of car information which are made by the sales member, may be sent with a photo to the management company, and the input operations may be executed in the management company.

<Modifications of Structure of Database>

In the embodiment discussed above, the used-car database is structured of the three types of databases such as the wait-for-registration database, the search database and the wait-for-settlement database. The embodiment of the present invention is not, however, limited to this database architecture. For example, the data in those three types of databases may be recorded in a single used-car database, and there maybe provided status flags such as a wait-for-registration flag, a search flag (the car being open on the market) and a wait-for-settlement flag (purchase reserved), thus managing the data.

In the embodiment discussed above, when in the car registration process, the server 1 generates the car management number based on the predetermined rule. The embodiment of the present invention is not, however, confined to this procedure. What may be taken otherwise is, for example, not that the server 1 generates the car management number but that a frame number in the car registration data is used directly as a car management number.

<<Second Embodiment>>

Figure 16:
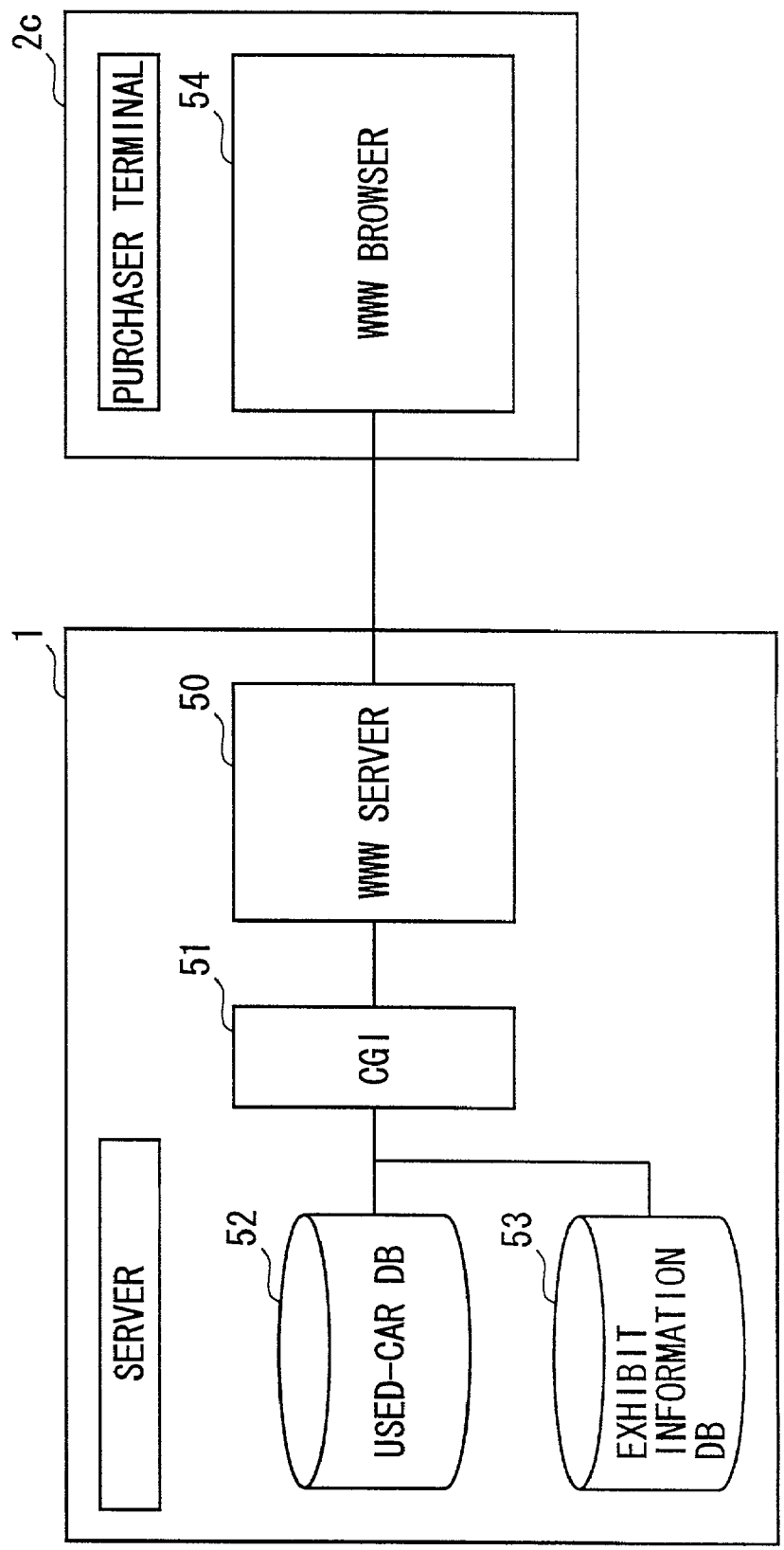
FIG. 16 is a diagram showing a system architecture of the car dealing system in a second embodiment of the present invention.
Figure 21:
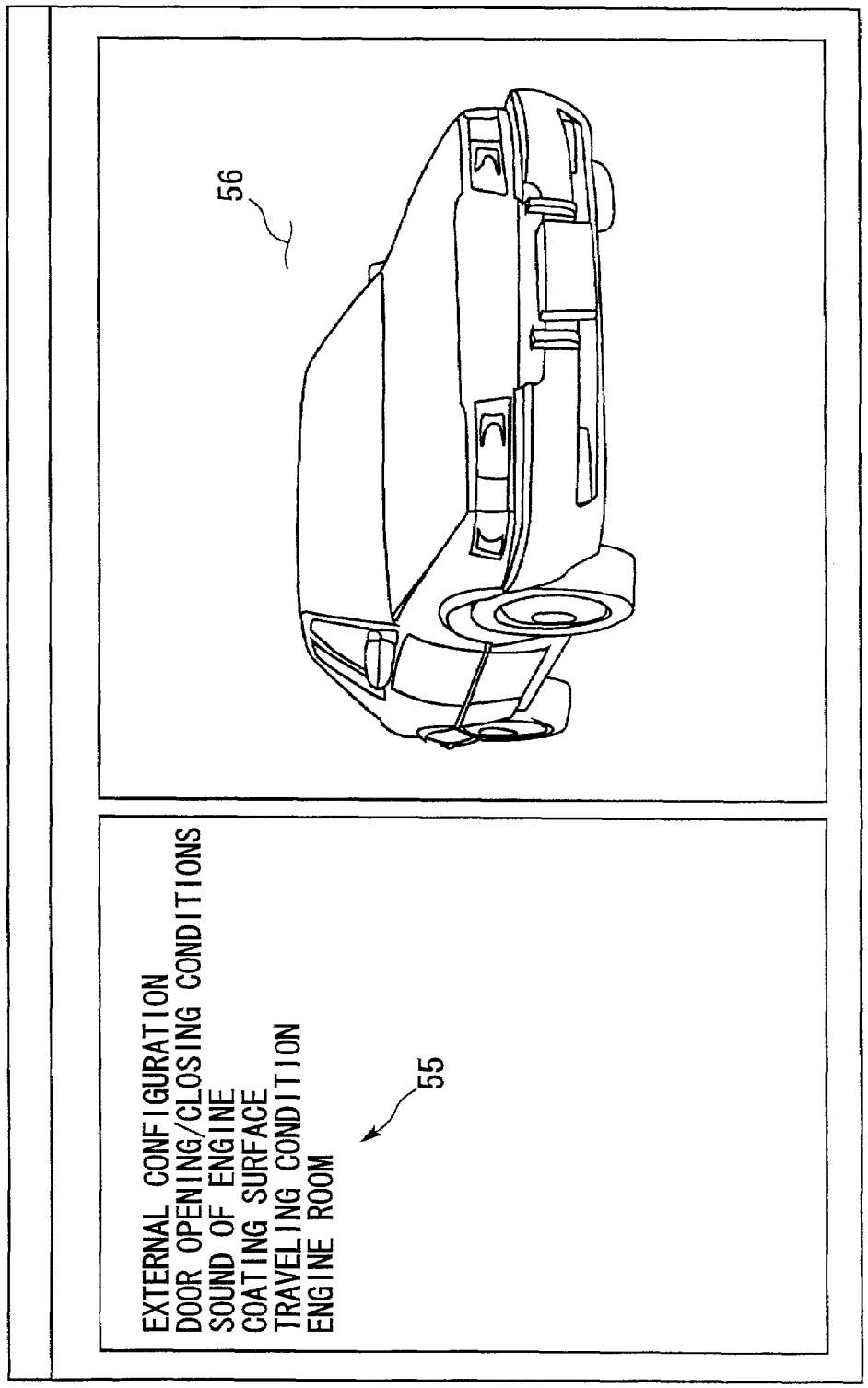
FIG. 21 is a diagram showing an exhibit information display screen.

A second embodiment of the present invention will hereinafter be described with reference to FIGS. 16 through 21. FIG. 16 is a diagram showing a system architecture of the car dealing system in the second embodiment of the present invention. FIG. 17 is a table showing a data structure of a used-car database 52 shown in FIG. 16. FIG. 18 is a table showing a data structure of an exhibit information database 53 shown in FIG. 16. FIG. 19 shows an example of a display screen of a list of searched results displayed in a purchaser terminal 2c shown in FIG. 16. FIG. 20 is a diagram showing a purchase screen in the second embodiment. FIG. 21 shows an example of an exhibit information display screen.

The first embodiment has exemplified the information processing system in which the member desiring to buy the used-car is able to refer to the inspection certificate data of the used-car with the car information on the specifications of the used-car. The second embodiment will exemplify an information processing system for reproducing multimedia data of animated images formed by photographing the car and of a sound emitted when the car is driven. Other configurations and functions of the second embodiment are the same as those in the first embodiment. Therefore, the same components are marked with the same numerals, and the repetitive explanations thereof are omitted. Further, the drawings in FIGS. 1 through 15 are referred to as the necessity may arise.

<System Architecture>

FIG. 16 is a diagram showing a system architecture of the car dealing system in the second embodiment. This system is also configured by connecting the server 1 installed in the management company for managing the data to the purchaser terminal 2c via the network as in the first embodiment.

The server 1 in the second embodiment includes a WWW server 50 for providing web pages to the network, a common gateway interface (which will hereinafter be abbreviated to CGI 51) for providing the display data to the WWW server 50, a used-car information database 52 for storing the used-car information, and an exhibit information database 53 for storing exhibit information.

The WWW server 50 provides the web page in response to a request given from the network on the basis of HTTP (HyperText Transfer Protocol).

The CGI 50 receives a command from the WWW server 50 and executes a process of searching the database.

The used-car information database 52 records the car information containing a name, type and year model of the car. The exhibit information database 53 records the car exhibit information containing the animated images and sounds.

The purchaser terminal 2c includes a WWW browser (hereinafter simply referred to as the browser) 54, and issues a request to the WWW server 50, whereby a web page is displayed. Architectures of the server 1 and of the purchaser terminal 2c are the same as those of the server 1 and the member terminal 2, and hence their repetitive explanations are omitted.

<Data Structure>

FIG. 17 shows a data structure of records stored in the used-car information database 52. Data in one line in FIG. 17 may be defined as a record of the used-car information database 52. This record corresponds to one single car and consists of data in fields such as a car management number, a name of maker, a type, a name of car, a year model and a price.

Among these pieces of data, the car management number is a numeral used as a unique key used for the server 1 to identify the car. The car management number, as in the case described in the first embodiment, may be given by the server 1. Alternatively, a car frame number may also be used directly as the car management number.

FIG. 18 shows a data structure of records stored in the exhibit information database 53. Data in one line in FIG. 18 may be defined as a record in the exhibit information database 53. One record consists of multimedia data about elements such as an external configuration etc of one single car. This record includes fields such as a car management number, an exhibition data number, an explanation, a data format and a pointer to exhibit information.

The car management number is, as in the case shown in FIG. 17, a numeral used for a server 11 to identify the car. Further, the exhibition data number is a number for identifying the exhibit information of one single car.

The "explanation" field is stored with text information for explaining the exhibit information in the record concerned. The text information may be itemized into, e.g., [external configuration], [door opening/closing conditions], [sound of engine], [coating surface], [traveling condition], [engine room] etc. The "explanation" field has a fixed length, and hence NULL data is padded in a margin.

The "data format" field is recorded with a data category of the exhibit information in the record concerned. The data categories are, for example, MPEG, MP3 and so forth.

The "pointer-to-exhibit information" field is stored with an address on the hard disk where a substance of the exhibit information concerned exists. The CGI 50 accesses the exhibit information indirectly via the pointer to this piece of exhibit information.

In the exhibit information database 53, the number of records of the single car is not limited and may be set arbitrary. Further, the items of the exhibit information of the single car are not limited to [external configuration], [door opening/closing conditions], [sound of engine] etc, and an arbitrary combination thereof may be admitted.

<Functions>

The member desiring for purchasing inputs an URL (Uniform Resource Locator) to the browser, and accesses a search service of the server 1. The user specifies desired search conditions such as a name of maker, a name of car, a type, a year model a displacement etc, and requests the WWW server 50 to search. The WWW server 50 accesses the database via the CGI 50. As a consequence, a list of the searched results is displayed on the browser 54.

FIG. 19 shows a screen for displaying the list of the searched results. On this screen, a hyperlink is set to each car management number. For instance, when clicking 100001, a purchase screen is displayed through communications with the server 1 and through a process by the CGI 50.

FIG. 20 shows an example of the purchase screen. This purchase screen is substantially the same as the purchase screen in the first embodiment except for a [→ more details] button 54. When the prospective buyer of the car presses the [→ more details] button 54 by the pointing device 28, command in formation for displaying the exhibit information identified by the car management number "100001", is transmitted to the CGI 50 of the server 1.

The CGI 50 extracts data related to the car management number "100001" from the exhibit information database, then structures HTML configuring the exhibit information display screen, and sends the structured HTML back to the browser.

FIG. 21 shows an example of the exhibit information display screen. This screen is configured by two segments of frames provided right and left. An exhibit content selection box 55 is displayed in the left frame, while an image display box 56 is displayed in the right frame. Character strings each showing an exhibit content are displayed in the exhibit content display box 55. The character strings are information stored in the "explanation" field in the exhibit information database 53 shown in FIG. 18. For example, the character strings are, e.g., "external configuration", "door opening/closing conditions", "sound of engine", "coating surface", "traveling condition" and "engine room".

Hyperlinks are set to those character strings, and, when clicking any one of the hyperlinks, the exhibit data corresponding thereto are displayed in the image display box 56 within the right frame.

For example, the hyperlink to [external configuration] is http://www.usedcar.com/cgi-bin/presentation?car=100001&seq=1. When clicking this hyperlink, a presentation CGI of the server 1 is invoked. The presentation CGI recognizes "car management number=100001" from "car=10001", and also recognizes "exhibit data number=1" from "seq=1".

Then, the presentation CGI specifies a record in the exhibit information database with above two pieces of information used as keys. Further, the presentation CGI sends the exhibit information of the specified record as a MIME (Multipurpose Internet Mail Extensions) content back to the browser.

MIME is known as a standard method of coding the binary data, and therefore its explanation is omitted. Further, the platforms for reproducing MPEG data, MP3 data and other multimedia data on the browser are nowadays well prepared, and hence explanations of mechanisms thereof are omitted.

The prospective buyer having confirmed the exhibit information and determined the intention of purchasing presses the [purchase] button 44 shown in FIG. 20 by use of the pointing device 28. As a result, the operation enters a step of a purchase process via an authentication process about the member information etc as in the first embodiment.

As discussed above, according to the present information processing system, the external configuration and the respective components of the used-car are expressed as the animated images or sound, and the animated images formed in a way that moves the camera give a well expression of how a color coating, a luster and a reflection change. Further, it is by far easier to grasp the conditions of the car than by using the still image data with a high resolution. Therefore, the present car dealing system is capable of speeding up the process that the prospective buyer determines the intention of buying the used-car.

Moreover, the requirement of the high resolution is comparatively small, and hence there is a smaller communication load than in the prior art owing to advancements of the motion picture compression technology.

<Modified Examples>

In the embodiments discussed above, the record in the exhibit information database 53 contains the pointer to the exhibit information. The embodiment of the present invention is not, confined to the record structure described above. For instance, as a substitute for the pointer to the exhibit information, the exhibit information, i.e., the image data and the voice (sound) data may be recorded as elements of the record in the exhibit information database 53. In this case, however, it is desirable that the exhibit information be set to a fixed length in order to facilitate accessing.

In the second embodiment, as in the first embodiment, the inspection certificate is displayed on the purchase screen as shown in FIG. 20. The embodiment of the present invention is not, however, limited to this display mode.

Namely, apart from the inspection certificate, en effect yielded by a combination of pieces of exhibit information containing the car information, the animated image data and the voice (sound) data described in the second embodiment, speeds up the process that the prospective buyer determines the intention of purchasing the used-car. As a matter of course, the architecture in the second embodiment may be combined with the architecture in the first embodiment.

What is claimed is:

1. A car sale information providing system comprising:
   a car information storage unit stored in a host device and including mappings of car information containing at least a name, a type, a year and a model of a car to car inspection information obtained as a result of inspecting the car concerned, said car information storage unit comprising a search database and a wait-for-registration database;
   a car information input device connected to the host device, the car information input device inputting the car information;
   a checking unit which checks whether or not the car information input by the car information input device contains the inspection information corresponding to the car information;
   a number generating unit which generates a car management number in accordance with a predetermined rule if the car information input by the car information input device does not contain the inspection information;
   a registering unit which registers the input car information together with the car management number in the wait-for-registration database if the input car information does not contain the inspection information and which registers the input car information in the search database if the inputted car information contains the inspection information;
   an inspection indication output unit which searches the wait-for-registration database and which transmits inspection indicative information for prompting an inspection of a car for which the car information does not contain the inspection information together wit the car management number corresponding to said car information input by the input device to an inspector terminal;
   a receiving unit which receives the inspection information together with the car management number and which transfers the car information indicated by the received car management number to the search database from the wait-for-registration database;
   a search unit included within the host device which outputs an input screen in response to input conditions when searching the car information stored in said search database of said car information storage unit, and which searches based on conditions input via the input screen; and
   a car information output unit included within the host device which outputs display information, including a purchase indication interface which transmits car purchase information containing the searched car information and the car inspection information corresponding to the car information.

2. A car sale information providing system according to claim 1, further comprising:
   an exhibit information storage unit included in the host device which stores mappings of plural categories of exhibit information containing at least one of animated image data and sound data to the car information;
   a header search unit included in the host device which searches a header of the car information;
   a header display unit included in the host device which displays said header of each of the items of car information as a result of the search, the header being displayed in a selectable manner; and
   a display unit included in the host device which outputs car screen information when the header is selected, including an output indication interface giving an indication of outputting the car information with its header selected and an indication of outputting exhibit information corresponding to the car information output.

3. A car sale information providing system according to claim 2, wherein said car information storage unit stores mappings of the car information to car inspection information as a result of inspecting the car concerned, and
   said display unit further displays the car inspection information corresponding to the car information.

4. A car sale information providing method comprising:
   inputting car information into a storage unit included within a host device, the car information containing at least a name, a type, a year and a model of a car, said storage unit including a search database and a wait-for-registration database;
   checking whether or not the car information input contains the inspection information corresponding to the car information;
   generating a car management number in accordance with a predetermined rule if the car information input does not contain the inspection information;
   registering the input car information together with the car management number in the wait-for-registration database if the input car information does not contain the inspection information and registering the input car information in the search database if the input car information contains the inspection information;
   searching the wait-for-registration database and transmitting inspection indicative information for promoting an inspection of the car for which the car information does not contain the inspection information together with the car management number corresponding to said car information input to an inspector terminal;
   receiving the inspection information together with the car management number and transferring the car information indicated by the received car management number to the search database from the wait-for-registration database;
   outputting an input screen to a terminal device connected to the host device for searching the car information and searching based on conditions input via the input screen;
   displaying, on a terminal device connected to the host device, the searched car information and the car inspection information corresponding to the same car information; and
   transmitting car purchase information from the host device.

5. A car sale information providing method according to claim 4, further comprising:
  searching car information stored in a storage unit within a host device and containing at least a name, a type, a year and model of a car;
  displaying a header of each item of car information output from the host device as a result of the search, the header being displayed in a selectable manner;
  outputting, when the header is selected, the car information with its header selected;
  searching plural categories of exhibit information containing at least one of animated image data and sound data, which are stored corresponding to the car information; and
  outputting the exhibit information from the host device.

* * * * *